United States Patent [19]
Yoshida et al.

[11] Patent Number: 6,103,300
[45] Date of Patent: *Aug. 15, 2000

[54] METHOD FOR MANUFACTURING A RECORDING MEDIUM HAVING METAL SUBSTRATE SURFACE

[75] Inventors: Ichiro Yoshida; Hiroshi Iida; Isamu Ito; Hiroyuki Nakamura, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,208

[22] Filed: May 28, 1997

[30] Foreign Application Priority Data

Dec. 27, 1996 [JP] Japan .................................. 8-350833

[51] Int. Cl.[7] ...................................................... G11B 5/82
[52] U.S. Cl. ................... 427/128; 428/694 SG; 134/3; 134/41; 510/165; 510/167; 510/268; 510/488
[58] Field of Search ................... 428/694 R, 694 TR, 428/694 SG; 510/165, 167, 268, 488; 134/3, 41; 427/128

[56] References Cited

U.S. PATENT DOCUMENTS

| | | | |
|---|---|---|---|
| 3,748,176 | 7/1973 | Gagliani | 134/2 |
| 3,957,529 | 5/1976 | Alexander et al. | |
| 4,128,691 | 12/1978 | Shirahata et al. | 428/336 |
| 4,239,552 | 12/1980 | Perner et al. | 134/28 |
| 4,788,992 | 12/1988 | Swainbank et al. | 134/64 R |
| 4,900,363 | 2/1990 | Bream et al. | 134/3 |
| 4,915,710 | 4/1990 | Miyazaki et al. | 51/309 |
| 5,221,362 | 6/1993 | Porta et al. | 134/40 |
| 5,437,779 | 8/1995 | Shige et al. | 205/106 |
| 5,560,977 | 10/1996 | Yamamoto et al. | 428/141 |
| 5,695,572 | 12/1997 | Brunner et al. | 134/3 |

FOREIGN PATENT DOCUMENTS

| | | |
|---|---|---|
| 61-256689 | 11/1986 | Japan . |
| 5185284 | 7/1993 | Japan . |
| 6260463 | 9/1994 | Japan . |
| 7121862 | 5/1995 | Japan . |

Primary Examiner—Stevan A. Resan
Attorney, Agent, or Firm—Greer, Burns & Crain, Ltd.

[57] ABSTRACT

A substrate, on which a base metal layer and a magnetic recording metal layer are to be deposited, is cleaned by contacting it with an aqueous solution of at least one compound selected from a carboxylic acid or L-ascorbic acid having a pH of 5.0 or less.

6 Claims, 5 Drawing Sheets

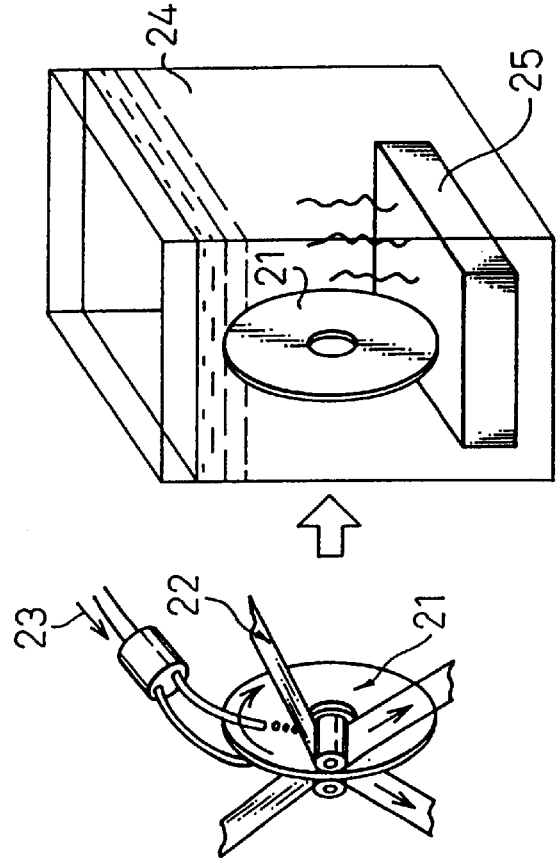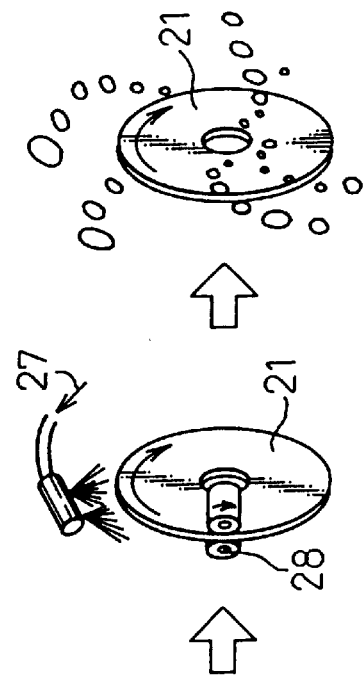

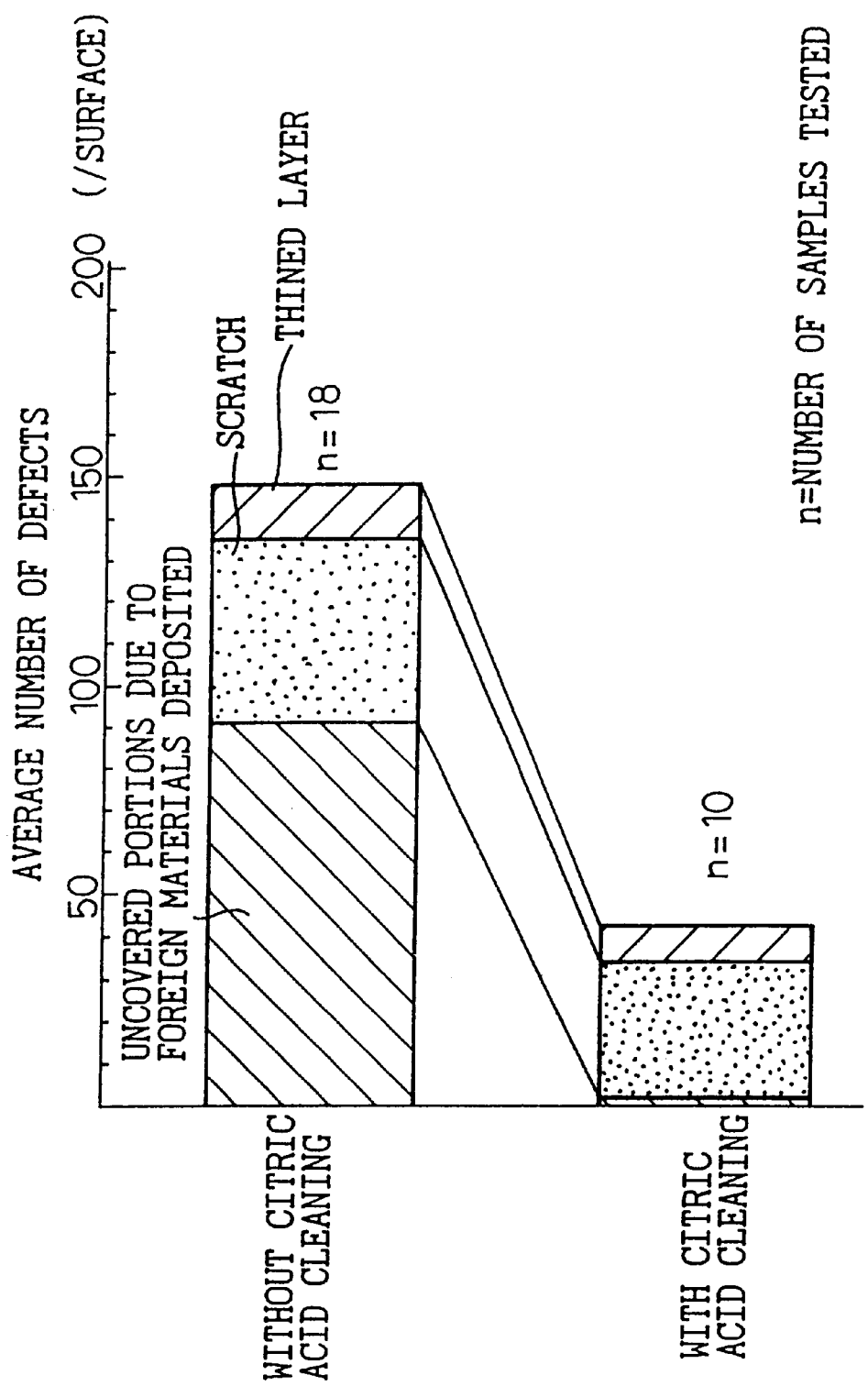

METHOD FOR MANUFACTURING A RECORDING MEDIUM HAVING METAL SUBSTRATE SURFACE

BACKGROUND OF THE INVENTION

Field of the Invention

The invention relates to a recording medium, particularly a magnetic recording medium, and a process for producing a magnetic recording medium adapted for use as a magnetic disc, and a process for cleaning such a disc, particularly a process for ultrapure cleaning a substrate, just before depositing a magnetic film on the surface of the substrate.

Recently, it is required that a magnetic recording medium have improved data-recording density and enlarged capacity, as well as having small size and low head floating height. Therefore, a recording medium adapted for use as such a magnetic disc suffers from error-generating defects, even if such defects are as small as in the order of submicrons. Thus, the invention relates to a process for cleaning a magnetic disc by removing contamination caused by minute foreign materials which are apt to be deposited during the process for producing such a recording medium, and a process for storing a recording medium without depositing foreign materials on the surface of the cleaned disc.

DESCRIPTION OF THE RELATED ART

FIG. 1 is a plan view for illustrating the entire internal structure of a magnetic disc apparatus. While a magnetic disc D rotates in at a high speed, a magnetic head h is transferred in the radius direction, to seek and record/reproduce the information. FIG. 2 is an enlarged cut-away view of a magnetic disc at the position of the magnetic head h.

In a process for producing a thin film-type magnetic disc D, the surface of a substrate 1, made of a nonmagnetic material such as aluminium and glass, is plated with a NiP layer 2, on which a base layer 3 such as Cr, etc. is sputtered. Next, a magnetic material such as CoCrTa and CoNiCr is sputtered to deposit a thin magnetic layer 4, and thereafter carbon, etc. is sputtered to form a protective layer 5. Finally, a lubricant 6 such as perfluoropolyether is coated to complete the magnetic disc.

The recording/reproducing information are effected by high speed rotation of the magnetic disc D in the direction a, shown by an arrow, while the magnetic disc floats by means of air pressure generated by its rotation (the floating gap G is shown by 9).

Such a magnetic disc is transferred to the step of depositing a magnetic recording film 4, after the steps of forming texturing grooves on the surface 2 of the NiP plated substrate and then scrubbing the substrate with pure water.

When a metal is sputtered on a magnetic disc medium to deposit a magnetic film, on the surface of which ground scraps generated in the texturing step and floating dust in the cleaning room are present, such scraps and dust may result in defects of the magnetic film causing errors in operation. Furthermore, when the surface of a recording medium is textured, scratched protrusions are sharpened and the sharp ends of protrusions are ground during contact with the head, on which such ground scraps are deposited, and thus the floating capability of the head is deteriorated to cause a head-crash.

Minute metallic abrasives and floating dust are usually observed on the surface of the substrate, after the texturing step is finished. They could not be completely removed even by means of scrubbing and ultrasonic cleaning. In the texturing step, thin linear scratches are formed on the NiP substrate by means of minute abrasives. However, there remain a large number of minute scratched NiP powder deposited on the surface of the substrate, which powder cannot be removed completely by scrubbing or supersonic cleaning. Also there are floating dusts deposited on the substrate even in a clean room. Although such dusts are crushed during scrubbing, complete removal of the crushed fine dust are impossible.

Furthermore, if a textured NiP substrate is not subjected to immediate metal sputtering, a problem is raised for dust to deposit again on the substrate during its storage. It is inevitable to keep the substrates in preliminary storage before subjecting them to metal sputtering, in order to produce various types of recording media efficiently.

Referring to such technical problems, the object of the invention resides in complete removal of minute foreign materials deposited after the texturing step and also in prevention of depositing such foreign materials during the storage after the cleaning step.

SUMMARY OF THE INVENTION

The inventors devoted their efforts to solve such problems, and discovered that the objects set forth above could be produced by cleaning the disc not with pure water but with an aqueous solution which contains at least one compound selected from the group consisting of a carboxylic acid and L-ascorbic acid and exhibits a pH of 5.0 or less.

Thus, the invention resides in a process for cleaning a recording medium, characterized by comprising the step of contacting a recording medium or a precursor thereof with an aqueous solution which exhibits a pH of 5.0 or less and contains at least one compound selected from the group consisting of a carboxylic acid and L-ascorbic acid.

In addition, according to the invention, there is provided a process for producing a recording medium, in which the surface of a substrate adapted for use as a recording medium is textured, and then the cleaning set forth above is effected, and thereafter a recording film is formed on the cleaned surface. Also, there is provided a recording medium produced as such. The recording film may include a magnetic layer, a magneto-optical recording layer or the like, and, if necessary, a base layer and a protective layer.

It is possible for a recording medium produced by means of the present cleaning process to reduce the number of defects generated in the recording film converted to that for a 3.5 inch disc to 100 or less, even 50 or less, per the surface of a disc, particularly to reduce the number of stripped defects generated in the recording film converted to that for a 3.5 inch disc to 10 or less, even 5 or less, furthermore 2 or less per surface of a disc. The defects of a recording film will be described later.

In addition, according to the invention, a process for depositing a recording film, wherein, after finishing said cleaning step, said substrate adapted for use as a recording medium is stored in an aqueous solution, which contains at least one compound selected from the group consisting of a carboxylic acid and L-ascorbic acid, and exhibits a pH of 5.0 or less, and is then taken out of said aqueous solution just before depositing said recording film on said substrate, and thereafter is subjected to said depositing step.

BRIEF DESCRIPTION OF DRAWINGS

FIGS. 4A to 4E illustrate a process for cleaning a magnetic recording medium according to the present invention.

FIG. 5 illustrates the cleaning effect according to the invention.

DESCRIPTION OF THE PREFERRED EMBODIMENTS

Figure 3A:
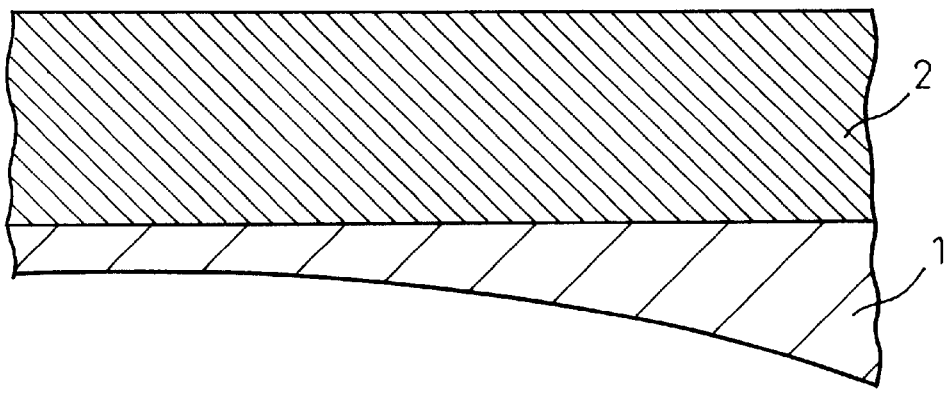
FIGS. 3A to 3C illustrate a process for producing a magnetic disc.
Figure 3B:
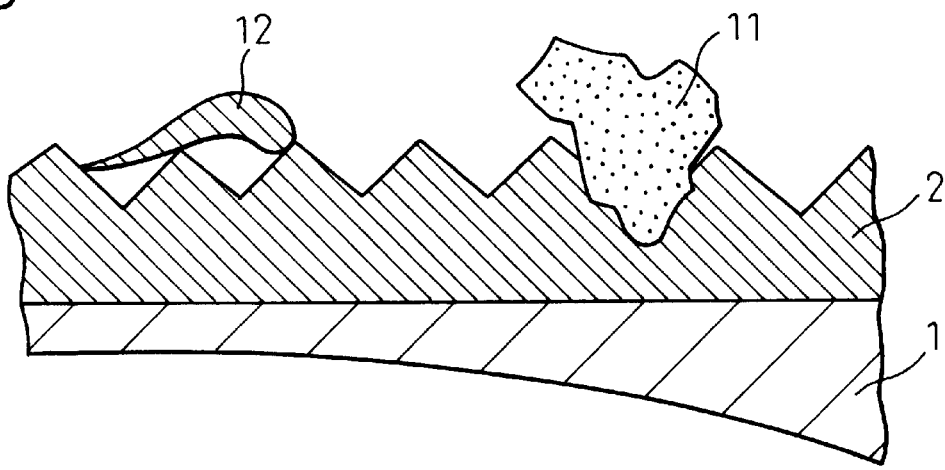
Figure 3C:
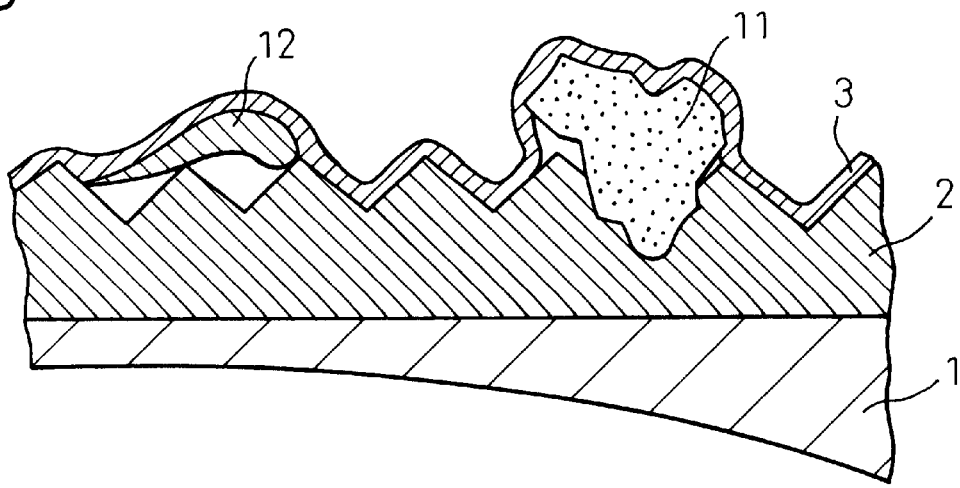

Referring to FIG. 3, an example of a process for producing a magnetic recording medium is shown. After forming NiP-plated base layers 2 on the both sides of a donut-shaped substrate made of a nonmagnetic material, e.g., aluminum, minute texturing grooves 8 are formed on the surface of the rotating nonmagnetic substrate in the circular direction, by pressing an abrasive tape onto the substrate. It is difficult to completely wash away the abrasives 11 and the ground powder of NiP 12, which were deposited on the textured surface during the formation of the texture.

Next, a Cr base layer 3 is deposited on the texturing grooves, in order to improve the horizontal orientation of the crystal of a Co alloy. If foreign materials such as the abrasives 11 and the ground powder 12 still remain on the textured surface, the Cr base layer 3 is deposited such that it covers the foreign materials and powder.

Figure 1:
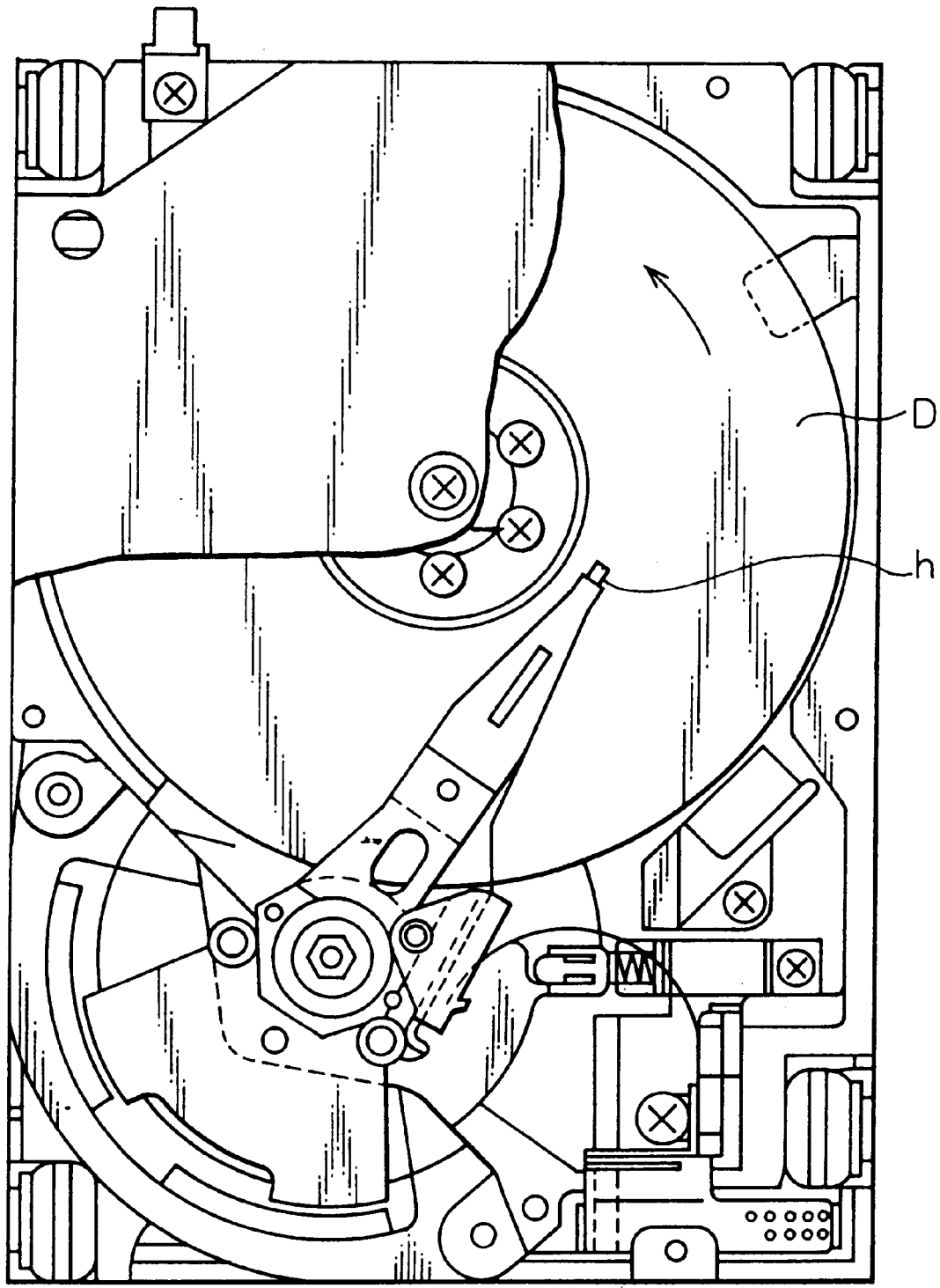
FIG. 1 illustrates the internal structure of a magnetic disc apparatus as a whole.
Figure 2:
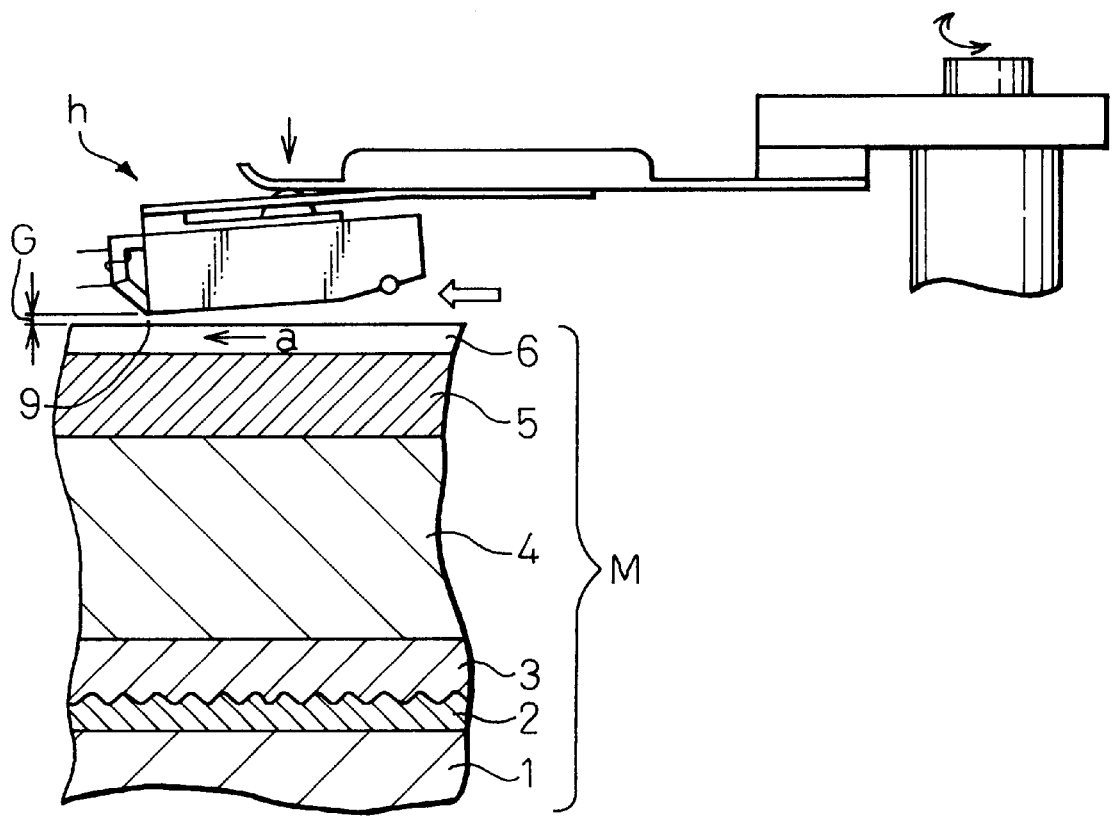
FIG. 2 is a vertical sectional view of a magnetic head and a magnetic disc.

Thereafter, a magnetic layer 4, e.g., a Co alloy, as well as a protective layer 5 and a lubricant layer 7 are formed on the base layer 3 (not shown in the figure, c.f. FIG. 2).

The invention is not only suitably applied for producing such a magnetic recording medium, but also generally for other recording medium.

Next, the invention will be illustrated in more detail, referring to FIG. 4. In order to form texturing grooves on the NiP-plated surface of disc substrate 21, e.g., of aluminum, a slurry containing diamond or alumina abrasives 23 is fed on the surface of the disc substrate 21, which is rotated while being caught between cloth tapes 22 (c.f. FIG. 4(a)).

After the texturing step is completed, the disc substrate 21 is dipped in the cleaning liquid 24 of the invention, preferably applying ultrasonic cleaning by means of an oscillator 25 (FIG. 4(b)).

According to the invention, the cleaning liquid 24 is an aqueous solution containing a compound selected from the group consisting of a carboxylic acid or L-ascorbic acid, which exhibits less than 5.0 of pH. An inorganic acid is not effective as a cleaning liquid, and it must be an aqueous solution containing an organic compound which contains a carboxyl group or may contain such a group when the compound is dissociated. Although not restricted by theory, it seems that a carboxyl group has an affinity to a metal and forms a hydrophobic film on the surface of the metal, and thus leads to the effects of the invention.

As the examples of such a carboxylic acid, citric acid, lactic acid, malonic acid, succinic acid, malic acid, acetic acid, formic acid, etc. may be mentioned. However, acetic acid and formic acid exhibit volatility, therefore it is preferable to apply an acid having more than 2 carbon atoms.

The Ph of the aqueous solution must not be more than 5.0, otherwise the effects for removing liquid stain, etc. will become insufficient, and the substrate will suffer from being damaged. The lower limit of pH is not determined. The smaller the value of pH is, the higher the cleaning capability is. However, if the value of pH is too small, the cleaning solution exhibits a higher viscosity, which leads to difficulty in handling. Practically, cleaning solution is chosen to exhibit a pH of not less than 0.1, more preferably a pH of not less than 1.0, in order to have a suitable viscosity.

After cleaning the substrate with such a cleaning solution, scrubbing is effected by applying ultrapure water 27 and using a sponge piece 28.

Next, the substrate is transferred to spin-drying (d) and then to metal sputtering (e) as shown in FIG. 4.

All of the sequential steps set forth above are carried out usually in a clean room.

Corresponding to the recent tendency for increasing the recording density, it is not possible to sufficiently prevent the defects (errors) from appearing in the magnetic film formed by sputtering after cleaning the disc with pure water. Such defects include: ① Uncovered portions of the magnetic film due to the foreign materials deposited on the surface of the base layer of the magnetic film (submicron size), ② scratched portions formed in the base layer, and ③ thinned portions of the magnetic film due to deposition of floating dust during sputtering. FIG. 5 illustrates the numbers of defects formed during the cleaning step effected by means of pure water, errors were observed in the amount of about 150/surface when a magnetic disc of 3.5 inches in diameter was recorded in the density of 400 Mbit/inch. Contrary to this, the numbers of errors were reduced to 40/surface, when the magnetic disc was cleaned by using a citric solution according to the invention. The defects were measured by means of an error-tester. The numbers of stripped portions were reduced really to 1 to 2/surface according to the invention. To the contrary, such numbers were 90/surface in the prior art cleaning. Thus, it is recognized that the invention is very much superior to the prior art.

Referring to FIG. 4, there is no problem when metal sputtering is effected, immediately after scrubbing and spin-drying. It is necessary otherwise to keep the cleaned magnetic disc in a dust-free condition, before subjected to the sputtery. However, deposition of dusts cannot be avoided, even if the magnetic disc is kept in a clean room. According to the invention, it is recognized that a carboxylic acid or L-ascorbic acid is effective also in the case of such a temporary storage. It is possible to maintain the disc substrate as clean as just after cleaning until immediately before their usage, when they are kept in this solution.

Although not limited by the theory, the effects of the invention are considered to be as follows. Because a carboxylic acid or L-ascorbic acid is capable of slightly dissolving the surface of a NiP recording medium substrate, such an acid is evidently effective to remove deposited material, e.g., floating dusts, and also liquid stains. If a NiP substrate, on which floating dust deposited, is scrubbed by means of pure water, deposited materials may be crushed to the order of less than 1 $\mu$m but it is very difficult to completely remove the submicron materials. Even if ultrasonic cleaning is also applied, it is not possible to completely remove the deposited submicron materials. In addition, it is not possible to remove liquid stains by dipping the substrate in an inorganic acid, e.g., sulfuric acid, chloric acid, etc. Such liquid stains result in generating errors, similarly to the deposited floating dusts. Contrary to this, a carboxylic acid or L-ascorbic acid as recited in claims of the invention is capable of easily removing these defects.

It is also possible to slightly dissolve and round the sharp protrusions of minute defects, which were formed during the texturing step, by being dipped in the aqueous solution of a carboxylic acid or L-ascorbic acid, optionally with ultrasonic wave being applied.

Furthermore, it is possible to protect the cleaned substrates from contamination of floating dusts, by storing them in an aqueous solution of a carboxylic acid or L-ascorbic acid.

EXAMPLES

The magnetic discs applied in the following examples and comparatives examples were constructed as shown in FIG. 2. The following layers were sequentially deposited on the surface of an aluminum-based substrate 1 of 3.5 inches in diameter and about 0.9 mm in thickness, a NiP plating base layer 2 of 10 $\mu$m in thickness, which was then textured in a depth of about 0.01 $\mu$m by means of a slurry containing abrasive of about 1 $\mu$m in size, and thereafter a Cr base layer 3 of 1000 Å in thickness, a CoCr-based magnetic layer 4 of 200Å in thickness, and a protective carbon layer 5 of 200Å in thickness by means of a sputtering apparatus. Finally a lubricant layer 6 of 20Å in thickness was formed thereon by dipping the disc substrate in a liquid of diluted lubricant, i.e., perfluoropolyether.

The disc substrate was estimated by measuring the numbers of foreign materials deposited on the surface of substrate, after subjected to texturing, ultrasonic cleaning, scrubbing, and spin-drying, as shown in FIG. 4, under the following conditions:

Texturing Condition
  i) Processing cloth tape—2501 EG (sold by Chiyoda K.K.).
  ii) Processing liquid—Slurry containing alumina or diamond abrasives dispersed in water.
  iii) Rotation of disc substrate—100 rpm.
  iv) Speed of processing cloth tape—25 mm/minute.

Ultrasonic Cleaning Condition
  i) Frequency of ultrasonic wave—40 KHz.
  ii) Power of ultrasonic wave—300 KW.
  iii) Circulating filtration—Constant circulating filtration by means of 0.1 $\mu$m filter.
  iv) Time of ultrasonic cleaning process—4 minutes.
  v) Cleaning liquid—see later.
  vi) Temperature of cleaning liquid—23° C.

Scrubbing Condition
  i) Scrubbing material—Roller-shaped Belkrin, a foamed polyvinyl chloride (sold by Kanebo Co.).
  ii) Tool scrubbing Rotation—300 rpm.
  iii) Scrubbing shower—Ultrapure water.
  iv) Time of scrubbing—60 seconds.
  v) Temperature of ultrapure water—23° C.

Spin-Drying Condition
  i) Rotation of spin—1500 rpm.
  ii) Time of spin rotation—20 seconds.

Measurement of Deposited Foreign Materials of 0.5 $\mu$m or More in Size
  i) Apparatus for measuring defects on the surface by means of Laser—RS 1320 (Hitachi DECO Co.).
  ii) Photomal (dark) voltage—450 V.
  iii) Photomal (light) voltage—300 V.
  iv) Estimation—Numbers of deposited foreign materials, except for cut-away defects, obtained by counting the numbers thereof, observed by means of a microscope at 1000 times of the magnitude (as numbers/surface area of the disc).

Example 1 Capability of Removing Minute Foreign Materials.

The tested liquids Nos. 1 to 5 were used.
No. 1—Ultrapure water only.

No. 2—Aqueous solution of citric acid dissolved in the ratio of 20 g/l of ultrapure water (pH=2.0).

No. 3—Aqueous solution of lactic acid dissolved in the ratio of 20 cc/l of ultrapure water (pH=2.2).

No. 4—Aqueous solution of malonic acid dissolved in the ratio of 20 g/l of ultrapure water (pH=2.3).

No. 5—Aqueous solution of L-ascorbic acid dissolved in the ratio of 20 g/l of ultrapure water (pH=2.7).

In every cleaning process of test Nos. 1 to 5, ultrasonic cleaning, scrubbing and then spin drying were sequentially effected, and the numbers of deposited foreign materials of 0.5 $\mu$m or more in size/surface of the disc substrate were counted.

TABLE 1

| No. | Nos. of deposited foreign materials* |
| --- | --- |
| 1 | 60 to 100/surface |
| 2 | 0 to 2/surface |
| 3 | 0 to 4/surface |
| 4 | 0 to 4/surface |
| 5 | 0 to 3/surface |

*material of 0.5 $\mu$m or more in size

Example 2 Capability of Removing Minute Foreign Material by Means of Cleaning Solutions Nos. 6 to 10 Having Various pH.

No. 6—Aqueous solution of citric acid dissolved in the ratio of 20 g/l of ultrapure water (pH=2.0).

No. 7—Aqueous solution of citric acid dissolved in the ratio of 20 g/l of ultrapure water, adjusted pH to 3.0 by adding $Na_2CO_3$.

No. 8—Aqueous solution of citric acid dissolved in the ratio of 20 g/l of ultrapure water, adjusted pH to 4.0 by adding $Na_2CO_3$.

No. 9—Aqueous solution of citric acid dissolved in the ratio of 20 g/l of ultrapure water, adjusted pH to 5.0 by adding $Na_2CO_3$.

No. 10—Aqueous solution of citric acid dissolved in the ratio of 20 g/l of ultrapure water, adjusted pH to 6.0 by adding $Na_2CO_3$.

TABLE 2

| No. | Nos. of deposited foreign materials* deposited on surface |
| --- | --- |
| 6 | 0–3/surface |
| 7 | 4–11/surface |
| 8 | 7–25/surface |
| 9 | 63–88/surface |
| 10 | 60–115/surface |

*material of 0.5 $\mu$m or more in size

Example 3 Capability of Storaging Cleaned Disc Substrates, While Protecting Them from Contamination with Dust.

The disc substrates subjected to ultrasonic cleaning with citric acid in the experiment No. 2 of Example 1 were subjected to various conditions of storage for 24 hours and aftertreatments, and then estimated.

TABLE 3

| No. | Storaging medium | Aftertreatment | | Nos. of foreign materials* deposited on surface |
|---|---|---|---|---|
| 11 | clean booth | 24h | — | 8 to 17/surface |
| 12 | ultrapure water | 24h | spin drying | 11 to 12/surface |
| 13 | citric-acid (15 g/l) | 24h | scrubbing→ spin drying | 0 to 1/surface |
| 14 | L-ascorbic acid (15 g/l) | 24h | scrubbing→ spin drying | 0 to 2/surface |

*materials of 0.5 μm or more in size

Example 4 Capability of Removing Liquid Stains.

Disc substrates stained with liquid stains (i.e., N, P, C, etc. which could not be cleaned by means of an inorganic acid) were dipped in various cleaning liquids for 20 seconds as shown in Table 4 below, and the capability of removing liquid stains were investigated. In the Table, ○ and x represent "removed" and "not removed", respectively.

TABLE 4

| No. | | | Removal of Stains |
|---|---|---|---|
| 15 | pure H₂O | 20 sec | x |
| 16 | pure H₂O + surfactant | 20 sec | x |
| 17 | 1% H₂SO₄ | 20 sec | x |
| 18 | 1% HCl | 20 sec | x |
| 19 | 20 g/l citric acid | 20 sec | ○ |
| 20 | 20 cc/l acetic acid | 20 sec | ○ |
| 21 | 20 cc/l formic acid | 20 sec | ○ |
| 22 | 20 g/l L-ascorbic acid | 20 sec | ○ |
| 23 | 20 g/l malic acid | 20 sec | ○ |
| 24 | 20 g/l succinic acid | 20 sec | ○ |
| 25 | 20 g/l malonic acid | 20 sec | ○ |
| 26 | 20 cc/l lactic acid | 20 sec | ○ |

We claim:

1. A method for manufacturing a recording medium, comprising the steps of:
   texturing a surface of a substrate, said surface being a metal surface;
   dipping said substrate in an aqueous solution which contains at least one compound selected from the group consisting of carboxylic acid and L-ascorbic acid and exhibits a pH of 5.0 or less after said texturing step; and
   depositing a base layer and a magnetic layer on said substrate after said dipping step.

2. A method as claimed in claim 1 further comprising a step of applying an ultrasonic vibration to said substrate during said dipping step.

3. A method as claimed in claim 1 further comprising the steps of scrubbing said surface of said substrate with ultrapure water after said dipping step, and drying said substrate after said scrubbing step.

4. A method as claimed in claim 1, wherein said substrate is an aluminum-based substrate having a NiP plated surface.

5. A method as claimed in claim 1, wherein said carboxylic acid is at least one acid selected from the group consisting of citric acid, lactic acid, malonic acid, succinic acid, malic acid, acetic acid and formic acid.

6. A method as claimed in claim 1, wherein said dipping step is for removing inorganic micro particles from said textured surface.

\* \* \* \* \*